United States Patent [19]

Schlomer et al.

[11] Patent Number: 4,788,017

[45] Date of Patent: Nov. 29, 1988

[54] PROCESS FOR THE IMPROVEMENT OF THE HOMOGENEITY OF HIGHLY REACTIVE OF HIGHLY REACTIVE POLYCONDENSATES

[75] Inventors: Franz-Robert Schlomer, Dormagen; Wolfgang Volker, Tonisvorst; Hartwig Hupfer, Bargteheide; Karl E. Ott; Bodo Muller, both of Hamburg, all of Fed. Rep. of Germany

[73] Assignee: Messer. Griesheim GmbH, Fed. Rep. of Germany

[21] Appl. No.: 89,837

[22] Filed: Aug. 27, 1987

[30] Foreign Application Priority Data

Sep. 11, 1986 [DE] Fed. Rep. of Germany ....... 3630928

[51] Int. Cl.$^4$ .................. B29C 35/16; B29C 47/88
[52] U.S. Cl. ........................................ 264/28; 62/63; 62/64; 62/380; 264/143; 264/211.13; 264/211.18; 425/71; 425/325; 523/149; 523/307; 528/481
[58] Field of Search ............... 264/28, 211.13, 211.18, 264/237, 348, 141, 143; 425/71, 325, 377, 378 R; 528/481; 62/55.5, 63, 64, 380; 523/149, 307

[56] References Cited

U.S. PATENT DOCUMENTS

| | | | |
|---|---|---|---|
| 3,038,205 | 6/1962 | Plummer | 425/71 X |
| 3,277,656 | 10/1966 | Bill et al. | 62/63 |
| 3,609,805 | 10/1971 | Fritsch | 425/71 |
| 3,734,415 | 5/1973 | Franz et al. | 425/325 X |
| 4,137,025 | 1/1979 | Graves et al. | 425/71 |
| 4,212,171 | 7/1980 | Soecknick | 62/63 |
| 4,397,158 | 8/1983 | Brenik et al. | 62/380 |
| 4,696,779 | 9/1987 | Wideman | 264/211.13 |

*Primary Examiner*—Jeffery Thurlow
*Assistant Examiner*—Leo B. Tentoni
*Attorney, Agent, or Firm*—Connolly & Hutz

[57] ABSTRACT

The homogeneity of highly reactive polycondensates is improved in a process involving batch operations in a reactor, followed by extrusion and then cooling by a coolant to the point of solidification after which the polycondensates are milled and removed. The cooling is carried out with a low-boiling liquified gas.

9 Claims, 1 Drawing Sheet

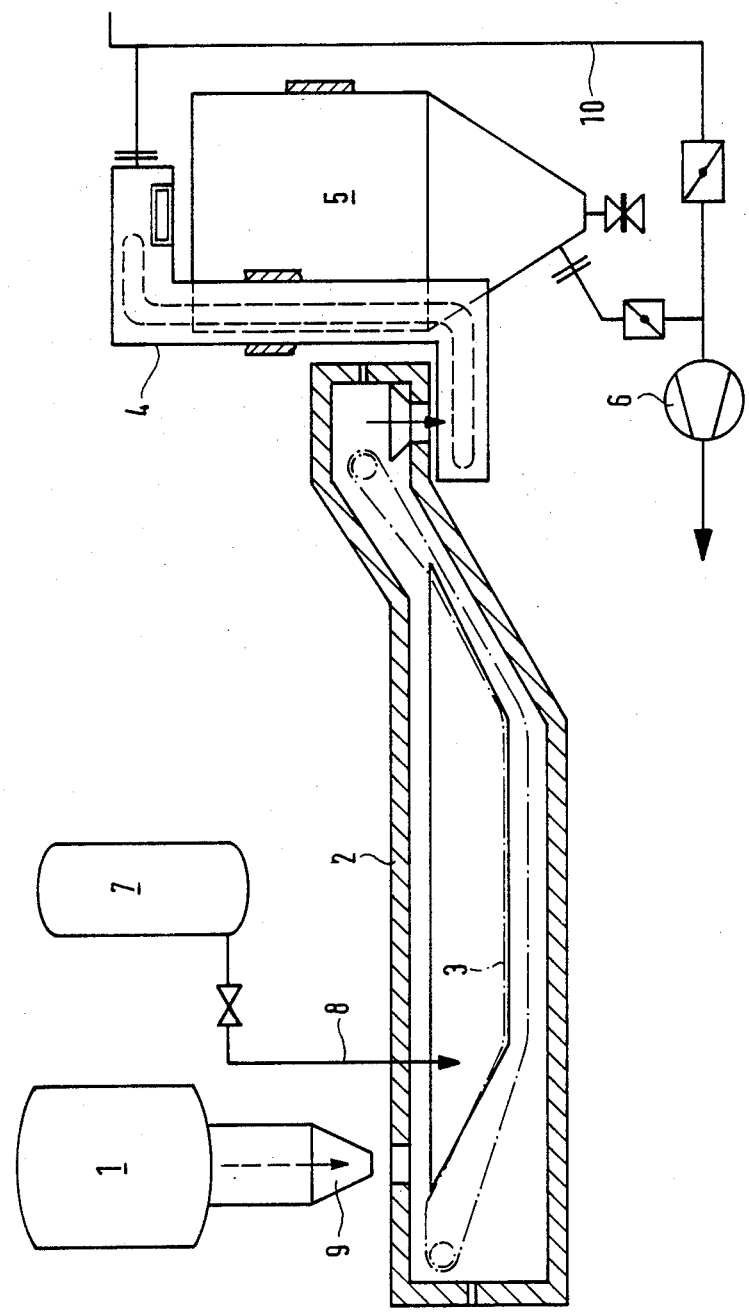

PROCESS FOR THE IMPROVEMENT OF THE HOMOGENEITY OF HIGHLY REACTIVE OF HIGHLY REACTIVE POLYCONDENSATES

BACKGROUND OF THE INVENTION

Highly reactive polycondensates, especially thermosetting plastics, are produced in batch operations in reactors. After extrusion from reactors, the synthetic resin plastics are cooled with water in order to obtain certain required and desirable product qualities with respect to the physical characteristics of the synthetic resin plastic. By cooling with water, further reaction of the synthetic resin is stopped. The normal procedure is then to collect the synthetic resin issuing from the reactor in large troughs and cover it with cooling water. After the cooling, the water is let out, and the resin removed manually. Then, it is dried and milled.

This milled synthetic resin is fairly hard and brittle, but is not yet finally set. By raising the temperature once again, it becomes soft and fusible again for a short time before hardening finally and irreversibly. Thus, these types of synthetic resins are employed as bonding agents for molded articles, coatings, and other industrial goods, for example, the linings for brakes. The characteristic for tempering of synthetic resin plastics is the B-time or period. It expresses the time of reaction for a synthetic resin plastic, at a certain temperature and under momentarily existing conditions, to pass to the B-state (see DIN 16916 T1). This B-time, of course, is quite short, however, it is not a preliminarily determinable constant. Indeed, it fluctuates over about 2 min. within a given batch. For the purpose of further processing into molded articles, an advantageous plastic is one with negligible fluctuation in its B-time, inasmuch as a uniform setting or hardening will give rise to products which are qualitatively of higher value.

SUMMARY OF INVENTION

An object of the invention is therefore to create a procedure for improving the homogeneity of highly reactive synthetic resin plastics which will result in products with more uniform B-times than before.

The reason for the improvement in the qaulity of sythetic resin plastics when they are manufactured according to the procedure of the invention is considered to be this, that, as a result of the more rapid cooling through use of a low-boiling liquified gas, instead of cooling with water, more uniform molecular dimensions are obtained. These bring about, in turn, a more uniform setting time throughout the entire batch. In the case of synthetic resins which, according to the invention, are cooled with liquid nitrogen, a fluctuation of the B-time of less than 1 min. will be in evidence throughout the entire batch, for example. In experiments, values of 12 sec have already been achieved.

As opposed to the previous processing method, in which the synthetic resin was decanted into troughs and covered with water for cooling it, the procedure according to the invention can be completed by a single pass through a cryo immersion bath, through which the synthetic resin courses while on a conveyor belt after having been extruded from the reactor. It would be to good advantage at this point to supply the synthetic resin to the conveyor in strips, since strips of this nature cool completely more quickly than full batches.

THE DRAWINGS

The single FIGURE illustrates schematically an installation for conducting the procedure according to the invention.

DETAILED DESCRIPTION

The most important parts of the installation as illustrated in the FIGURE are the reactor 1, the cyro immersion bath 2, and the buffer tanks 5. The liquid nitrogen is the coolant agent present inside the cyro immersion bath 2; the supply route of the nitrogen from the reservoir 7 is indicated by an arrow 8.

The synthetic resin produced in the reactor 1 is supplied to the conveyor belt 3, which runs through the cyro immersion bath 2, through a transversely-divided slotted die 9. Individual strands, which may be cooled more quickly and intensively than a solid resin mass, are passed through the transverse divisions of the slotted die 9. Transverse staves or other transverse members may be mounted on the conveyor belt in order to impose breaking-points upon the individual strands of synthetic resin. The temperature of a highly reactive synthetic resin, for example, reaches 90° C. at the point of exit from the transversely divided slotted die 9. The batch in the reactor 1 has a weight of about 2300 kg. The through-time in the cryo immersion bath 2 takes about 30 sec. The total extrusion time comes to 12 min. approximately, until the emptying of the reactor 1.

After passing through the cryo immersion bath 2, the synthetic resin, in a precrumbled state, proceeds to the buffer tanks 5 by means of the transporter 4. The buffer tanks are already ventilated by the vaporized cold nitrogen gas at the time of filling the immersion bath, since it entered into the buffer tanks 5 likewise by means of the transport 4. A low temperature fan 6 draws off the nitrogen gas from the buffer tanks 5. After completion of the filling process, and at the beginning of the extrusion, the bypass duct 10 on the buffer tanks 5 is opened, so that removal is no longer effected through the buffer tanks 5. There ensures a temperature adjustment inside the insulated buffer tanks 5; the final temperature of the pre-crumbled synthetic resin is now something like 30° C. The synthetic resin is at this point hard and brittle, and is pulverized for further processing.

The short time of artificial aging at 140°, which is the B-time, is, in the case of synthetic resins which are produced according to the invention, strictly uniformized. Fluctuation of the B-time throughout the entire batch amounts to less than 1 min. By contrast, the fluctuation in the case of synthetic resins produced according to the previous procedure amounts to 2 min. and more.

It is a further advantage that the synthetic resin no longer needs to be dried, and that the complete procedure of further processing up to the final milled and packaged product hinges immediately on the cooling and can now be incorporated into a single production line.

SUMMARY OF THE INVENTION

Highly reactive polycondensates, especially thermosetting plastics, are produced in batch operations in reactors 1, extruded therefrom, cooled with water, and, after hardening, fragmented and milled. The milled synthetic resins are employed as bonding agents in mixtures with other materials. For this purpose, the mixture is heated, at which time the synthetic resin softens once again, for a short time known as the B-time, before solidifying for the last time. This B-time fluctuates considerably in the case of each batch. For achieving the most uniform quality of the end products, the desirable thing is the shortest and most uniform possible B-time. This will be achieved, when the extruded synthetic resins are cooled in an instantaneous manner by using a low-boiling, liquified gas, preferably nitrogen.

What is claimed is:

1. In a procedure for obtaining a product from highly reactive polycondensate including the steps of producing the polycondensates in batch operations in a reactor, extruding the polycondensates, cooling the extruded polycondensates by a coolant to the point of solidification, milling the cooled solidified polycondensates to obtain ground polycondensates, using the ground polycondensates as a binder for composite materials by mixture with the materials, and heating and hardening the mixture to obtain the final product, the improvement comprising cooling the extruded polycondensates by using a low-boiling, liquified gas as the coolant to uniformize hardening time of the polycondensates.

2. Procedure according to claim 1, characterized in that the cooling is carried out with liquid nitrogen.

3. Procedure according to claim 2, characterized in that the extruded synthetic resin is conducted on a conveyor belt through a cryo immersion bath filled with cryogenic coolant.

4. Procedure according to claim 3, characterized in that the synthetic resin is passed onto the conveyor belt in strips, having been extruded through a transversely divided adjustable slotted die.

5. Procedure according to claim 4, characterized in that the synthetic resin is conveyed on a conveyor belt with transverse elevations for the purpose of impressing breaking-points.

6. Procedure according to claim 5, characterized in that the cooled and fragmented synthetic resin is stored temporarily in an insulated buffer tank for the purpose of achieving heat adjustment.

7. Procedure according to claim 6, characterized in that the buffer tanks are ventilated and pre-cooled at the time of filling the cryo immersion bath by means of the vaporized coolant.

8. Procedure according to claim 1, characterized in that the extruded synthetic resin is conducted on a conveyor belt through a cryo immersion bath filled with cryogenic coolant.

9. Procedure according to claim 1, characterized in that the cooled and fragmented synthetic resin is stored temporarily in an insulated buffer tank for the purpose of achieving heat adjustment.

* * * * *